J. CUSTER.
Seed-Planter.
No. 223,320. Patented Jan. 6, 1880.
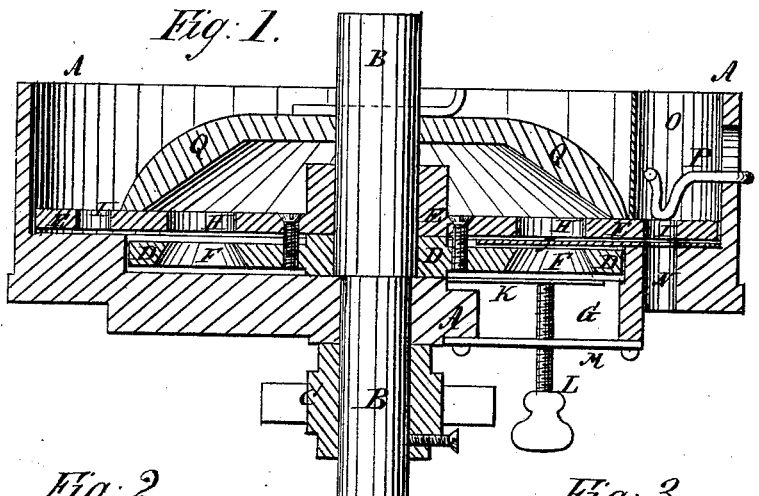
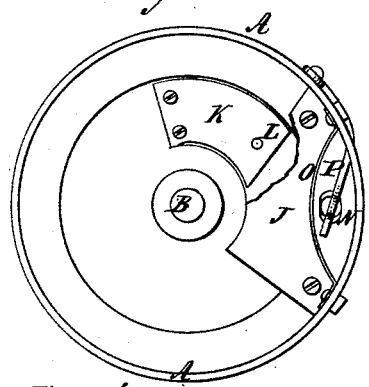
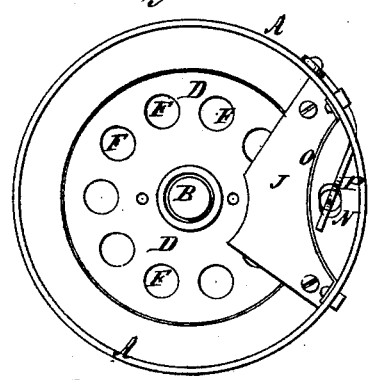
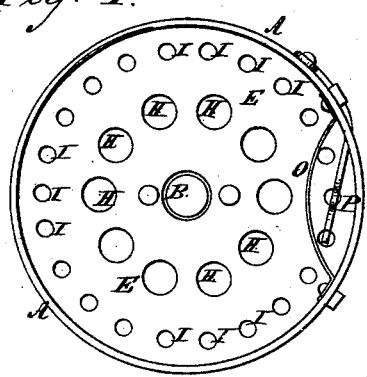
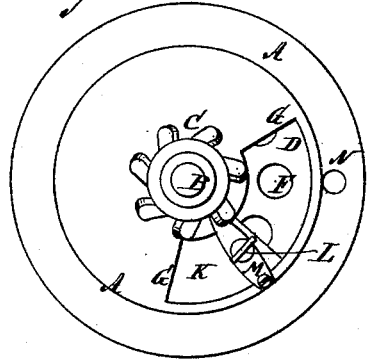
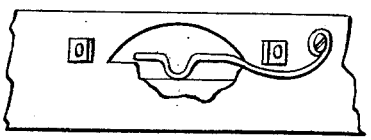
WITNESSES:
A. Schehl.
C. Sedgwick
INVENTOR:
J. Custer
BY Munn & Co
ATTORNEYS.

UNITED STATES PATENT OFFICE.

JOSEPH CUSTER, OF GOSHEN, OHIO.

SEED-PLANTER.

SPECIFICATION forming part of Letters Patent No. 223,320, dated January 6, 1880.

Application filed October 27, 1879.

*To all whom it may concern:*

Be it known that I, JOSEPH CUSTER, of Goshen, in the county of Clermont and State of Ohio, have invented a new and useful Improvement in Seed-Planters, of which the following is a specification.

Figure 1 is a sectional elevation of my improvement. Fig. 2 is a plan view, the cone and seed-dropping plates being removed. Fig. 3 is a plan view, the guard-plate and the upper seed-dropping plate being removed. Fig. 4 is a plan view, the guard-plate being removed. Fig. 5 is a plan view of the under side of the improvement. Fig. 6 is a side elevation of part of the improvement.

The object of this invention is to furnish seed-planters so constructed that they may be used for planting potatoes and small seeds, as required.

A represents the seed-hopper, which is made circular, and has a hole in the center of its bottom, in which is swiveled a vertical shaft, B. To the lower end of the shaft B is attached a gear-wheel, C, which is designed to be connected with the drive-wheel of the planter by suitable gearing, which gearing is not shown in the drawings, as there is nothing new in its construction. To the shaft B, above the bottom of the hopper A, are attached two plates, D E, the lower one, D, of which is the smaller, and revolves in a circular recess in the bottom of the hopper A.

The plate D has a circle of holes, F, formed in it, to receive potatoes and drop them to the ground through an opening, G, in the bottom of the hopper A. The holes F are flared downward, so that pieces of potato cannot stick in the said holes and clog the machine.

The upper plate, E, has a circle of holes, H, formed in it directly above the holes F of the plate D, as shown in Fig. 1. The plate E has a circle of holes, I, formed in its outer part, so as to be over the shoulder of the bottom of the hopper A, as shown in Fig. 1.

The holes H F are made large to allow potatoes to pass through them, and the holes I are made small to receive corn, beans, cotton, and other small seeds.

The plate D is placed so close to the bottom of the recess in which it revolves that pieces of potato cannot enter the space between it and the said bottom. The plates E D are placed so close together that pieces of potato cannot enter the space between them. The plate E is placed so close to the shoulder of the hopper-bottom that the seeds being planted cannot enter the space between it and the said shoulder.

To the shoulder of the bottom of the hopper A, over and a little in front of the discharge-opening G, is secured a plate, J, the forward edge of which is made sharp to cut the potatoes into pieces of the proper size to be planted.

To the bottom of the hopper A, at the forward edge of the opening G, is secured the edge of a plate, K, which projects beneath the cutting-plate J, and has the end of a hand-screw, L, swiveled to it, so that by turning the said screw it may be lowered into the opening G or raised against the cutting-plate J, to regulate the size of the pieces cut by the plate J and dropped to the ground, as may be required.

The screw L passes through a screw hole in a bar, M, attached to the lower side of the hopper-bottom, and which crosses the opening G.

In planting corn and other small seeds, the said seeds enter the holes I in the plate E, are carried around upon the shoulder of the bottom of the hopper A and dropped through the hole N to the ground. The part of the plate E above the discharge-hole N is separated from the rest of the hopper by a curved partition, O, which serves as a cut-off to prevent the plate E from carrying out any more grain than is contained in the holes I, so that the seed may be dropped in uniform quantities.

To the side of the hopper A is attached the outer end of a rod, P, which passes in through an aperture in the side of the hopper A. The inner part of the rod P is bent to rest upon the plate E and be drawn over the holes I, so as to press upon the seed in the said holes I and insure its dropping out. The rod P is made elastic to make its operation more effective.

When the machine is to be used for planting small seeds, the middle part of the plate E, including the holes H, is covered with a guard-plate, Q, attached to the shaft B, and made in semi-spherical or conical form, to prevent any seed from entering the holes H and being wasted.

The shape of the plate Q causes the seed to slide down it and rest upon the part of the plate E that contains the holes I.

Having thus described my invention, I claim as new and desire to secure by Letters Patent—

The circular seed-hopper having a recessed bottom with central hole and side hole, G, in combination with the shouldered shaft B, the wheel C to connect with the drive-wheel of a planter, the upper plate, E, having holes H I, the plate K, set-screw L, and the plate Q, all constructed and arranged as shown and described.

JOSEPH CUSTER.

Witnesses:
WILLIAM CUSTER,
C. S. LAYCOCK.